United States Patent [19]
Palmer et al.

[11] Patent Number: 6,099,906
[45] Date of Patent: Aug. 8, 2000

[54] IMMERSION PROCESS FOR IMPREGNATION OF RESIN INTO PREFORMS

[75] Inventors: Raymond J. Palmer, Newport Beach; Michael B. Palmer, Costa Mesa; Thomas Weege, Laguna Niguel, all of Calif.

[73] Assignees: McDonnell Douglas Corporation, St. Louis, Mo.; The Epoxylite Corporation, Irvine, Calif.

[21] Appl. No.: 09/100,941

[22] Filed: Jun. 22, 1998

[51] Int. Cl.[7] .......................................................... B05D 3/00
[52] U.S. Cl. ........................ 427/296; 427/350; 427/389.9; 427/430.1
[58] Field of Search ..................................... 427/296, 350, 427/389.9, 430.1; 264/510, 512, 257

[56] References Cited

U.S. PATENT DOCUMENTS

| | | | |
|---|---|---|---|
| 3,462,289 | 8/1969 | Rohl et al. | 117/46 |
| 3,937,855 | 2/1976 | Gruenwald | 427/54 |
| 4,196,231 | 4/1980 | Hubers | 427/240 |
| 4,215,161 | 7/1980 | Seibold et al. | 427/228 |
| 4,454,177 | 6/1984 | Feist | 427/294 |
| 4,963,396 | 10/1990 | Ito et al. | 427/294 |
| 5,403,537 | 4/1995 | Seal et al. | 264/511 |
| 5,415,892 | 5/1995 | Nishizawa | 427/295 |
| 5,433,915 | 7/1995 | Yamamoto et al. | 264/510 |
| 5,466,492 | 11/1995 | Kiessling | 427/522 |
| 5,500,164 | 3/1996 | Livesay et al. | 264/459 |

OTHER PUBLICATIONS

"Process Specification (PS–43R)", pp. 1–13, published by Epoxylite Corporation (no date).

"Encyclopedia of Chemical Technology: vol. 7", 4th ed., Kirk and Othmer eds., pp. 95–103, Feb. 17, 1994.

Encyclopedia of Chemical Technology: vol. 6:, 4th ed., Kirk and Othmer eds., pp. 701–704, Sep. 13, 1994.

*Primary Examiner*—Shrive Beck
*Assistant Examiner*—Paul D. Strain
*Attorney, Agent, or Firm*—Westerlund & Powell, P.C.; Robert A. Westerlund; Ramon R. Hoch

[57] ABSTRACT

A preform resin immersion process (PRIP) for impregnating resin into a preform for the fabrication of composite structures. The resin contains a heatactivated catalyst and a thixotropic agent which maintain the viscosity of the resin at selected low level during the resin immersion process. The dry preform is placed in an impregnation vessel, and the resin is held in a resin storage vessel, with both vessels initially held at vacuum of about 5.0 mm Hg torr to draw off any air or volatiles. Pressure is introduced into the resin storage vessel, causing the resin to flow through a line into the impregnation vessel which is still held at vacuum conditions. When enough resin is in the impregnation vessel to completely immerse the preform, the flow of resin to this tank is stopped. Once the resin has completely permeated the preform, the resin is drawn back into the resin storage vessel, and the saturated preform is raised up from the impregnation vessel so that the excess resin drips off into collection means. By carefully controlling the thixotropic nature and the viscosity of the resin along with the employment of a latent, heat-activated catalyst, the precisely correct amount of resin remains in the preform after the drip collection step is finished. The saturated preform is then conveyed to a conventional tool for final curing at high temperature and pressure.

22 Claims, 2 Drawing Sheets

IMMERSION PROCESS FOR IMPREGNATION OF RESIN INTO PREFORMS

BACKGROUND OF THE INVENTION

This invention relates to processes of forming fiber composite structures. More particularly, this invention relates to processes for impregnating dry fiber preforms with resin. Still more particularly, this invention relates to processes for creating resin impregnated preforms that can be held in a pre-cured stage indefinitely.

Composite structures are made from dry fiber preforms into which are introduced uncured resins which are then cured to form the finished component or structure. These composite structures offer very high strength and low weight but at a comparatively high cost due to the expenses associated with material handling and processing technology and the exotic fiber and resin materials used. The need for expensive equipment such as autoclaves and vacuum/pressure pumps and the large amount of highly skilled labor involved in making these parts all add to the cost. Any cost savings that could be achieved in any of these areas would permit wider use of these high performance composite components and structures.

The basic ingredients for a composite part, dry fiber preform and resin, can be combined in a number of ways. The industry normally uses one of three processes, depending upon the particular application. These three processes are Resin Transfer Molding or Modification of RTM, Resin Film Intrusion, and Standard "B" Resin Impregnated on to fiber tow's or woven fabric. Resin Transfer Molding (RTM) is a process that impregnates a dry fiber preform located in a mold with resin that is heated in separate containers and is mixed and pumped into the mold under pressure. The resin and catalyst or hardener are usually stored in separate containers that are usually heated to obtain low viscosity. The resin is pumped from the two containers and is mixed and immediately injected, under pressure, into the mold to impregnate the fiber preform. The resin used is thereby catalyzed prior to introduction into the mold. As such, the resin has limited or finite flow characteristics when passing through multiple layers of fiber and often cannot successfully impregnate large, thick or complex-shape structures. This will result in voids within the cured composite part, thereby lowering its strength. This process uses considerable excess catalyzed resin that remains in the pressure pot, if pre-catalyzed, or in the injection lines, if in line mix is used. This excess resin requires careful and often costly clean up work. U.S. Pat. No. 5,403,537 to E. C. Seal et al. for "Method for Forming Composite Structures" and U.S. Pat. No. 5,500,164 to M. Livesay and W. Gallup for "Method and Apparatus for Producing Large Fiber Reinforced Structures" are representative of this method wherein resin is impregnated under pressure into a dry fiber preform mold, then the composite structure is final cured in the mold.

Resin Film Intrusion (RFI) is another method for resin impregnation into a preform. As with Resin Transfer Molding, the resin is already catalyzed when it is united with the dry fiber preform. RFI avoids the use of excess resin by casting the resin by itself to the "B" stage as slabs or films of resin. These films are cut to size, laid on the tool surface, and then the dry fiber near-net-shape preform is placed over the cast "film" of resin in the tool. This lay-up is then placed within a complicated vacuum bag assembly and cured under vacuum pressure in an oven or under positive pressure in an autoclave or heated press. This process often fails to insure complete and uniform resin impregnation, particularly when the "B" stage resin must flow into thick structures or long deep stiffened structures.

The third and most widely used process employs individual plies of tape, tow or fabric that have already been impregnated with "B" stage resin. Since the resin only needs to wet one or the adjacent ply, it can completely fill the voids in the fibers. However, the "B" stage cure for the resin necessitates holding the impregnated plies in 0° storage prior to use. To form a part, the individual plies of tape, tow or fabric must be laid up by hand and then placed in a vacuum bag assembly. The lay-up is usually final cured in an autoclave. This process is very labor intensive, and the impregnated plies are troublesome to keep in cold storage and have a limited shelf life that carries with it attendant re-certification costs. U.S. Pat. No. 5,433,915 "Manufacturing Method of Composite Articles from Prepregs Which Avoids Internal Defects" is representative of an improved version of the complicated nature of this process wherein individual plies of pre-impregnated fabric are laid-up in molding jig of the matched die type, pressure is applied to the mold forcing out excess resin into a trap that is kept under back pressure to prevent micro cracks in the part.

For a different application, the Epoxylite Corporation, Irvine, Calif. has published Process Specification PS-43R which teaches a process for vacuum-pressure impregnation of resin into AC motors to provide a sealed insulation system capable of withstanding short term immersion. In this process, the stator of the motor is preheated to about 300° F. and placed in a vessel where vacuum is pulled for 30–60 minutes while monitoring the temperature of the stator. The stator temperature must be at least 100–120° F. immediately prior to the introduction of the resin into the vessel or there will not be successful impregnation. The vacuum in the vessel pulls in the resin until it covers the stator, and then pressure is introduced into the chamber to force the resin into the coils around the stator. The reference teaches that there is a critical relationship between the time of immersion, the temperature of the stator, and the viscosity of the resin. The relatively elevated temperature of the stator is necessary for the resin to penetrate it sufficiently. After the allotted time has passed, the pressure is released from the vessel, and the stator is lifted out of the resin, allowing the resin to wiped and otherwise drained off. The stator is then cured at 300° F., and the process is repeated with another immersion cycle, followed by a final cure. The object of the process is to seal the windings on the stator, and the strength of the final product is not seemingly affected by the resin one way or the other.

Based on the above and foregoing, it can be appreciated that there exists a need in the art for a process for created resin impregnated preforms which overcomes the above-discussed drawbacks and shortcomings of the presently available technology. More particularly, there presently exists a need in the art for a process that utilizes a relatively low viscosity resin that will completely impregnate the dry fiber preform while avoiding the high labor hours and cold storage requirements associated with standard "B" stage resin impregnated fabric plies.

As will become apparent hereinafter, the present invention fulfills this need in the art by providing a cost effective method to introduce the precisely correct amount of low viscosity resin into a multi-layer dry preform with complete penetration of the resin into the preform, incur little or no waste of excess resin, and involve no cold storage requirements.

SUMMARY OF THE INVENTION

The present invention encompasses a process for introducing resin into a dry fiber preform for use in the subsequent formation of a fiber-reinforced resin composite structure. The Preform Resin Immersion Process (PRIP) of this invention utilizes a modified resin with low viscosity and thixotropic properties and a latent, heat-activated catalyst. The thixotropic properties are achieved by means of added fillers such as clays and fumed silicas. The modified resin is introduced into the dry fiber preform in the following manner. Two connected vessels are used, a process vessel and a storage vessel. A line with a closing valve connects the bottoms of the two vessels. The preform is placed in the process vessel; the storage vessel holds the modified resin, which is stored under vacuum. Vacuum of 5.0 mm Hg or less is drawn on the process vessel and is held for a time, usually about 30 minutes, to remove any air or volatiles that might be present in the preform. Vacuum is vented in the storage vessel, and the valve is opened to the process vessel. The resin is drawn by vacuum from the storage vessel into the process vessel. The preform may need to be weighted down or secured to prevent it from floating. After sufficient resin has flowed into the process vessel to completely submerge the preform, the valve between the tanks is once again closed, and vacuum is vented in the process vessel. The vessel may then simply be left at atmospheric pressure, or the valve may be closed and held to allow up to 100 psi of air pressure to be applied to the process vessel, to accelerate the impregnation of the preform. Once the resin impregnation of the preform is complete, usually 5 to 30 minutes, vacuum is again pulled on the resin storage chamber, the valve between the vessels is opened, and the excess resin flows back into the storage vessel.

At this point the resin-soaked preform is then lifted into a vertically hanging position to allow the excess resin to drip down off the preform until only the proper amount of resin remains. The added thixotropic agent in the resin, the viscosity of the resin, and the temperature at which the process is conducted determine how much of the resin drips off the preform and, therefor, the amount of resin remaining in the preform. After this step, the resin-impregnated preform is then conveyed to a conventional tool, placed in a vacuum bag as appropriate, and cured in an oven, in an autoclave, or in a press for heat and pressure to complete the formation of the composite structure. Since the resin uses a heat-activated catalyst, the high heat in this final conventional step represents the only point in the process where increased viscosity from the catalysts becomes a factor. Prior to this point, the resin mixture is quite thin, with its flow characteristics being controlled only by the thixotropic agent and the inherent viscosity of the resin itself at the process temperature. One preferred type of catalyst is a latent heat catalyst, known as a Blocked Lewis Acid Catalyst, that may be used in the range of 1% to 6% by weight. Preferred thixotropic agents include fillers such as fused silica, i.e. Carbosil, which may be used in the range of 0.5% to 3% by weight to control viscosity and resin pickup. The use of the thixotropic agent avoids the time/heat/viscosity problems encountered in the Epoxylite Process Specification discussed above.

The process of this invention has a number of advantages over the various drawbacks and shortcomings of the prior art discussed above. Complete and accurate resin impregnation is accomplished with no weighing or casting of resin. Proper specification of the resin to a supplier results in a liquid resin that is ready to process as received. This resin has optimal flow characteristics.

Since the resin does not require cold storage and is not moisture reactive, there is no concern about moisture condensing on cold resin, as is often the case in prior art resin processes. Since the resin uses a heat-activated catalyst, there is no concern about the resin hardening in the supply lines.

Since the resin retains its low viscosity prior to final cure, almost complete recovery of unused resin is possible. This process offers low cost composite fabrication with minimum limitations on size, shape or thickness of dry preform dimensions. Resultant mechanical properties of laminate panels are comparable to laminates made with state-of-the-art structural type resin systems.

BRIEF DESCRIPTION OF THE DRAWINGS

The various features and advantages of the present invention will become apparent from the following detailed description taken in conjunction with the accompanying drawings in which.

DETAILED DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
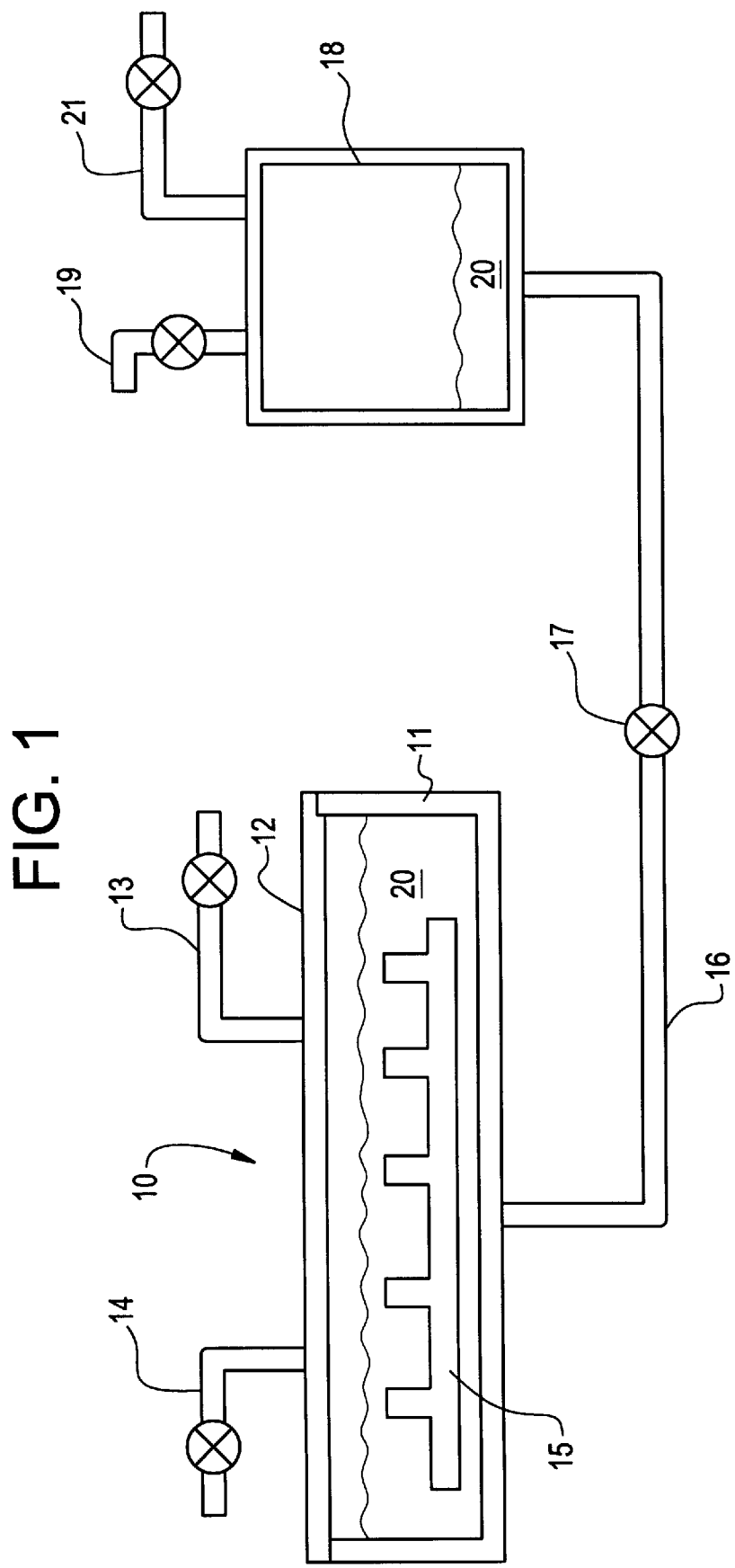
FIG. 1 is a schematic diagram of the various components of the system utilized to conduct the resin immersion process of this invention.

With reference to FIG. 1, there can be seen a diagram of the various vessels, lines and valves employed to conduct the resin immersion process of this invention. The preform 15 is shown immersed in the resin 20 within the impregnation vessel 10. The vessel 10 has a tub portion 11 that is covered by a removable top 12. Connected to the top 12 are a line 14 connected to a vacuum pump, not shown, and a line 13 connected to a pressure source, not shown. Connected to a lower portion of the tub 11 is another line 16 that is in fluid communication through a valve (closing gate) 17 to the resin vessel 18. The resin vessel 18 is connected to a resin supply line 19 through which additional resin may be added to the resin vessel 18. This line 19 is also connected to a pressure source which could be either connected to the atmosphere or to an inert gas source, not shown. A vacuum line 21 is also connected to the resin vessel 18 and communicates with a vacuum pump, not shown. The resin vessel 18 would normally have a removable top, not shown in this FIG. 1. The locations of the various lines and valves should not be dictated by their locations shown in this FIG. 1. The pressure line 13 and the vacuum line 14 should, however, be located above the highest anticipated resin level in the tub 11, although not necessarily connected to the removable top 12. Similarly, the vacuum line 21 and the pressure/resin supply line 19 to the resin vessel 18 need not be located on the top of the resin vessel 18. The stage of the resin immersion process illustrated in FIG. 1 is the point at which the resin 20 has been drawn into the resin vessel 10, the valve 17 closed, and the resin 20 is impregnating the preform 15 for a period of time sufficient for complete penetration of the resin 20 into the preform 15 to occur. Complex shape preforms with long or deep arms or flanges, in various directions, can be impregnated uniformly using this process.

The resin immersion process begins with a dry fiber (stitched) preform being placed into the tub 11 of the impregnation vessel 10. This preform can be of many shapes and sizes and is usually made up of a multiplicity of plies of fabric that are stitched together into the near-net shape of the composite part. The preform 15 here is a representative cross section of a curved wall section having integral ribs extending internally therefrom. Once the preform 15 is placed in the tub 11, the removable top 12 is installed onto the top of the tub 11 and the interior of the impregnation vessel 10 is evacuated by the action of the vacuum pump, not shown, acting through the vacuum line 14.

The resin 20 in the resin vessel 18 is pre-vacuumed via the vacuum line 21 and normally held under continuous vacuum during storage. When fresh resin is added to the system, it should be de-gassed until foaming is at a minimum. Vacuum should reach 5.0 mm Hg or lower, with the lowest practical level of vacuum producing the best results.

The next step in the process is to open the line 21 into the resin vessel 18 and, when pressure returns to atmospheric, open the valve 17. This allows the resin 20 from the resin vessel 18 to flow towards the low pressure/vacuum in the impregnation vessel 10.

Once the resin 20 in the impregnation vessel 10 has reached a level such that it completely immerses the preform 15, the valve 17 is closed. Impregnation of the preform 15 may be completed with vacuum valve 14 remaining open. If desired, the valve 14 may be closed and the valve in the line 13 may be opened to allow the vessel to return to atmospheric pressure, or, if necessary, to air pressure as high or higher than 100 psi. The introduction of atmospheric or higher levels of air pressure forces the resin, which is thixotropic and therefore somewhat resistant to flow, into the voids in the preform. After 5 to 30 minutes, the pressure, if used, may be released by opening valve 13. The next step in the process is to pull vacuum in the resin vessel 18. Then the valve 17 is re-opened. Atmospheric pressure forces the excess resin to flow back into the resin vessel 18 for storage for use with other preforms.

Once the excess resin 20 has been evacuated from the impregnation vessel 10, the valve 17 is again closed, and the removable top 12 is taken off the vessel 10 to expose the impregnated preform 15. The preform 15 is then lifted into a vertically hanging position by a hoist or crane, not shown. In this step, the tailored thixotropic viscosity of the resin 20 in the preform 15 allows precisely the correct amount of resin 20 to drip off of the saturated preform 15. The correct amount of thixotropic agent has been added beforehand to the resin 20 in order to achieve this "automatic" achievement of the precise amount of resin saturation of the preform, thus obviating the need in the prior art to either convey only a precisely weighed amount of resin to a preform or, alternatively, weighing out an exact amount of cast resin for use with the preform. One preferred thixotropic agent is a fumed silica, such as Carbosil, in the range of 0.5% to 3% by weight. The resin 20 that drips off of the saturated preform can be collected in the open impregnation vessel tub 11 or can be caught in a separate drip collection tank 24, shown in FIG. 2. The temperature of the process, usually room temperature, should be carefully controlled at this point to maintain the desired viscosity of the resin 20 as it drips off of the saturated preform 26.

Figure 2:
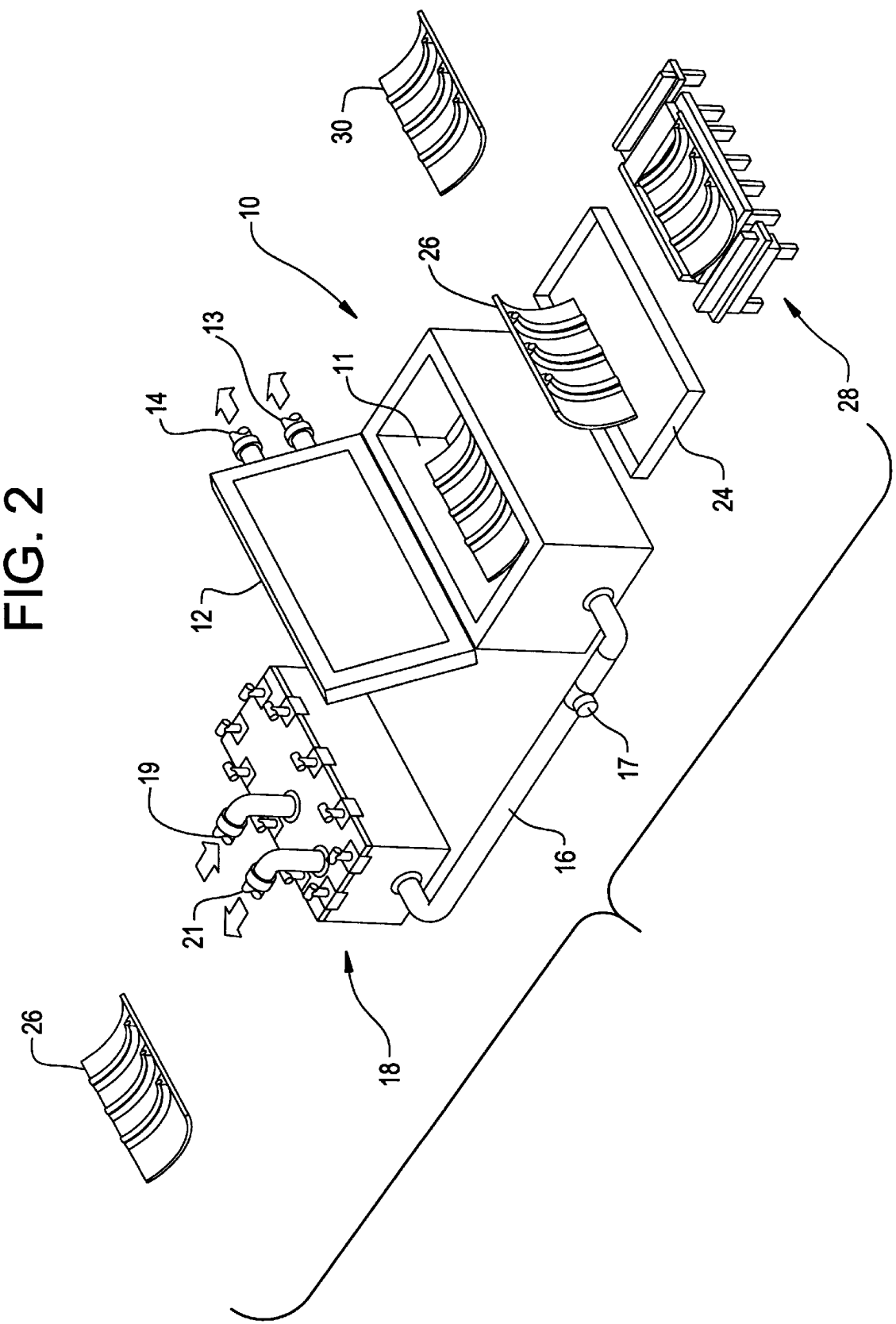
FIG. 2 is an isometric drawing showing the progress of the preform through the various steps of the resin immersion process.

At this point, the resin immersion process of this invention is complete. FIG. 2 shows the further steps in a process for finally curing the saturated preform 26, wherein the preform 26 is conveyed from the drip collection tank 24 to a tool 28 in which the preform is covered with the remainder of the tool, not shown. Within this tool, the resin-impregnated preform is placed under a vacuum bag, then heated in an oven or an autoclave to a temperature at which the heat-activated catalyst cross links the resin into its finally cured state in the preform to make the finished composite part, 28. A vacuum pump, not shown, acting through the vacuum line 14 is provided for the impregnation vessel 10.

This process was utilized to successfully fabricate a curved panel assembly for a high performance military fighter aircraft. The preform itself consisted of a contoured skin with a deep thin stiffening web almost 12" deep across the panels. The skin was made of 2 stacks of 7 layer multi-axial warp/knit fabric (14 total layers) that were stitched together using Kevlar® 29 1600d thread at 0.20" apart parallel rows at ⅛" stitch step (+5 row/inch×⅛" step=40 stitch penetrations per square inch). The amount of stitching is far more critical to the resultant damage tolerance properties of the panel than it is for the Preform Resin Immersion Process (PRIP). Only enough stitching is required to hold the shape of the preform during the immersion process. The skin then had a "⊥" shaped stiffener 12" high stitched through the flanges of the "⊥" and the skin to secure the stiffener in place.

In another process demonstration, a two stack warp/knit skin was first stitched together as above to a size of 3'×4'. Three 2-ply hat (_) shape details were stitched as flat details with a similar 40 penetrations/square inch pattern overall. The 3 hat sections were then folded or bent to form three hat shapes, 4' long with 1" flanges on each side, 6" deep hat webs and a 3" wide upper cap shape. The width between the hat webs at the base was made to be 4". Thus, the web walls of the cap were 3" wide at the top or cap and 4" wide at the base. These three hat shapes were mounted over an internal mandrel, located in exact position on the skin, and the flanges of the hats were stitched to the skin using the same Kevlar 29 1600d stitch thread and 4 rows of stitching ¼" apart in each flange of the hat shaped stiffener. Three "hat" shapes were attached to the skin in this manner. This stitched preform was then located in the impregnation chamber, the chamber was closed, and then the preform was immersed in the resin by the process of this invention. After immersion and impregnation were complete, the resin was withdrawn from the tank, and the preform was allowed to "drip" to the desired resin content. The impregnated preform was placed on a surface skin tool, the tool mandrels for the hats were inserted into place, and the preform was placed in a vacuum bag. The panel was final cured in an autoclave under standard heat and pressure. The completed part was fully impregnated and had good visual quality. These are just two examples that demonstrate the efficacy of the process of this invention.

The fabric used to make these parts was a 7 layer carbon fiber warp/knit product made to the requirements of a Boeing specification. Any suitable woven fabric could have been used to produce a similar part. The stitch thread and the stitch density were also made to meet a Boeing specification. Less stitch thread could have been used to merely hold the layers of warp/knit fabric together. The process has been used to impregnate from 1 to 18 stacks of 7 layer per stack warp/knit fabric (0.054"/stack×18 stacks≈0.97" cured panel thickness). There is every reason to expect an even thicker part may be made successfully using this immersion process.

Many other types of fabric can be used to make stitched near-net shape preforms and then use the preform resin immersion process to complete the panel fabrication.

Examples include, but are not limited to, braided fabric shapes, woven fabric, filament wound shapes made from not only carbon fibers but also glass, Kevlar (polyphenylene terephtalamide) or even hybrid mixes of fibers.

The resin used to fabricate these parts and panels was Epoxylite #7383, made by the Epoxylite Corporation in Irvine, Calif. This resin is an epoxy-based resin modified for low viscosity, with a thixotropic filler network of clay and fumed silicas to control resin flow and, accordingly, resin pick-up in the preform. The thixotropic agent is added in the amount of 0.5% to 3% by weight to the resin. The resin is a one-part formulation with a latent, heat-activated catalyst system to accomplish cure. The catalyst makes up 1% to 6% by weight of the resin mixture. Thus, the resin can be stored in large quantities at room temperature for long periods of time without exotherm or substantial viscosity growth. It is expected that other resins such as polyester, vinyl esters, and others could be modified to meet this process requirement. Also, the particular types and amounts of the catalysts and thixotropic agents chosen will necessarily be tailored to the particular resin that is selected.

In general, although a preferred embodiment of the present invention has been described in detail hereinabove, it should be clearly understood that many variations and/or modifications of the basic inventive concepts herein taught which may appear to those skilled in the pertinent art will still fall within the spirit and scope of the present invention, as defined in the appended claims.

What is claimed is:

1. A process for impregnating a composite structural part in which a dry fiber preform made up of a plurality of plies of fabric is impregnated with a low viscosity resin, wherein the resin contains a heat-activated catalyst to control start of cure and a thixotropic agent to control resin flow characteristics and coating thickness, the process consisting essentially of the steps of:

confining the dry fiber preform comprised of fabric within an impregnation vessel;

evacuating gases from the interior of the impregnation vessel by vacuum pumping;

conveying, while continuing the vacuum pumping, the resin from a resin storage vessel through fluid communication means into the impregnation vessel in an amount sufficient to completely immerse the fiber preform, wherein the impregnation vessel is held under vacuum until the fiber preform is completely immersed in the resin;

holding the resin in the impregnation vessel for a sufficient amount of time to allow the resin to completely penetrate and saturate the fiber preform wherein the resin is uncured;

withdrawing excess resin from the impregnation vessel back into the resin storage vessel;

lifting the saturated fiber preform from the impregnation vessel into a hanging position such that any excess resin remaining on the saturated fiber preform drips off into resin collection means, the saturated fiber preform thereby containing the correct amount of resin after excess resin has dripped off due to the predetermined low viscosity and controlled thixotropic nature of the resin; and curing the resin by conveying the saturated preform to a curing apparatus wherein the preform is heated to a temperature sufficient to activate the catalyst, thereby setting and curing the resin to form the composite structural part, and with the proviso that the process steps prior to the curing step are conducted at a temperature below that necessary to activate the catalyst.

2. The process of claim 1, wherein the impregnation vessel is held at vacuum prior to the introduction of resin into the vessel to remove air and volatiles from the dry fiber preform.

3. The process of claim 1, wherein the process temperature being held at a level sufficient to insure that the viscosity of the resin remains constant.

4. The process of claim 1 wherein the process temperature for the resin and the fiber preform is room temperature prior to the final step.

5. The process of claim 1, wherein the resin storage tank is held at vacuum of about 5.0 mm Hg or less except when the resin is conveyed to the impregnation vessel.

6. The process of claim 1, wherein the initial vacuum condition is followed by introduction of pressure inside the impregnation vessel to enhance penetration of the resin into the fiber preform.

7. The process of claim 6, wherein the introduced pressure is in the range of about 50–100 psi.

8. The process of claim 1, wherein the resin collection means is the impregnation vessel.

9. The process of claim 1, wherein the resin collection means is an apparatus separate from the impregnation vessel.

10. The process of claim 1, wherein the thixotropic agent is selected from the group consisting of clays, fumed silicas, and combinations thereof, wherein said thixotropic agent is present in a range of 0.5% to 3% by weight; the fabric is selected from the group consisting of knitted fabric, braided fabric, woven fabric, and filament wound fabric; and said fabric comprises fibers selected from the group consisting of carbon fibers, glass fibers, and polyphenylene terephthalamide fibers.

11. A process for fabricating a composite structural part in which a dry fiber preform comprising a plurality of plies of fabric is impregnated with a low viscosity resin, wherein the resin contains a heat-activated catalyst to control start of cure and a thixotropic agent to control resin flow characteristics and coating thickness, the process consisting essentially of the steps of:

(a) confining the dry fiber preform comprised of fabric within an impregnation vessel under vacuum;

(b) conveying the resin from a resin storage vessel, through fluid communication means, into the impregnation vessel in an amount sufficient to completely immerse the fiber preform by causing the pressure in the resin storage vessel to exceed the pressure in the impregnation vessel;

(c) holding the resin in the impregnation vessel under vacuum for a sufficient amount of time to allow the resin to completely penetrate and saturate the fiber preform; wherein said resin is uncured (d) withdrawing excess resin from the impregnation vessel back into the resin storage vessel by holding the resin storage vessel at vacuum and causing the pressure in the impregnation vessel to exceed the pressure in the resin storage vessel;

(e) lifting the saturated fiber preform from the impregnation vessel into a hanging position such that any excess resin remaining on the saturated fiber preform drips off into resin collection means, the saturated fiber preform thereby retaining a correct amount of resin for a subsequent final curing of the fiber preform after the excess resin has dripped off, wherein the retention of the correct amount of resin is due to the predetermined low viscosity of the resin and the amount of thixotropic agent; and (f) curing the resin by conveying the saturated preform to a curing apparatus wherein the preform is heated to a temperature sufficient to activate the catalyst, thereby setting and curing the resin to form the composite structural part, and with the proviso that the process steps conducted prior to step (f) are conducted at a temperature below that necessary to activate the catalyst.

12. The process of claim 11, wherein the process temperature being held at a level sufficient to insure that the viscosity of the resin remains constant.

13. The process of claim 11 wherein the process temperature is room temperature prior to step (f).

14. The process of claim 11, wherein the dry fiber preform comprises a multiplicity of plies of a fabric configured into the shape of the structural part, and wherein the structural part comprises a panel structure.

15. The process of claim 11, wherein the initial vacuum condition in step (c) is followed by introduction of pressure inside the impregnation vessel to enhance penetration of the resin into the fiber preform.

16. The process of claim 15, wherein the introduced pressure is at a pressure level effective to force the resin into voids in the fiber preform.

17. The process of claim 11, wherein the resin collection means is the impregnation vessel.

18. The process of claim 11, wherein the resin collection means is an apparatus separate from the impregnation vessel.

19. The process of claim 11, wherein the thixotropic agent is selected from the group consisting of clays, fumed silicas, and combinations thereof; the fabric is selected from the group consisting of knitted fabric, braided fabric, woven fabric, and filament wound fabric; and said fabric comprises fibers selected from the group consisting of carbon fibers, glass fibers, and polyphenylene terephthalamide fibers.

20. The process of claim 11, wherein the catalyst is a latent heat catalyst in the range of 1% to 6% by weight of the resin.

21. The process of claim 11, wherein step (f) further includes the application of pressure about the curing resin-saturated fiber preform.

22. The process of claim 11, further including a step (g) comprising assembling the cured, resin-saturated preform formed by step (f) in an aircraft.

* * * * *